United States Patent [19]

Kolossow

[11] Patent Number: 4,730,935
[45] Date of Patent: Mar. 15, 1988

[54] EXTRUSION APPARATUS FOR THE PRODUCTION OF MIXTURES OF MOLTEN SYNTHETIC MATERIAL

[75] Inventor: Klaus-Dieter Kolossow, Hambühren, Fed. Rep. of Germany

[73] Assignee: Hermann Berstorff Maschinenbau GmbH, Hanover, Fed. Rep. of Germany

[21] Appl. No.: 41,352

[22] Filed: Apr. 22, 1987

[30] Foreign Application Priority Data

May 9, 1986 [DE] Fed. Rep. of Germany ....... 3615586

[51] Int. Cl.[4] .......................... B29B 1/04; B01F 15/02
[52] U.S. Cl. ...................... 366/82; 366/137; 425/207
[58] Field of Search ................ 366/79, 75, 76, 77, 366/80, 81, 82, 87, 136, 137; 425/207, 208, 192 R, 149

[56] References Cited

U.S. PATENT DOCUMENTS

| | | | |
|---|---|---|---|
| 3,667,733 | 6/1972 | Fritsch | 366/81 |
| 3,719,351 | 3/1973 | Upmeier | 366/82 |
| 3,985,348 | 10/1976 | Skidmore | 366/76 |
| 4,015,833 | 4/1977 | Kim | 366/82 |

Primary Examiner—Robert W. Jenkins
Attorney, Agent, or Firm—Schwartz, Jeffery, Schwaab, Mack, Blumenthal & Evans

[57] ABSTRACT

An extrusion apparatus for the production of mixtures of molten synthetic material includes a gear pump which is provided in the flow of molten material. The gear pump comprises a housing and two meshing gear pump wheels. The line joining the centers of the two wheels extends at right angles to the central longitudinal axis of the hollow cylinder. Outlet and inlet openings are formed in the cylinder of the extrusion apparatus which lead directly into the gear pump housing into regions which are, respectively, upstream and downstream of the gear wheels. The major surfaces of the gear wheels are disposed horizontally relative to the central longitudinal axis of the hollow cylinder.

1 Claim, 4 Drawing Figures

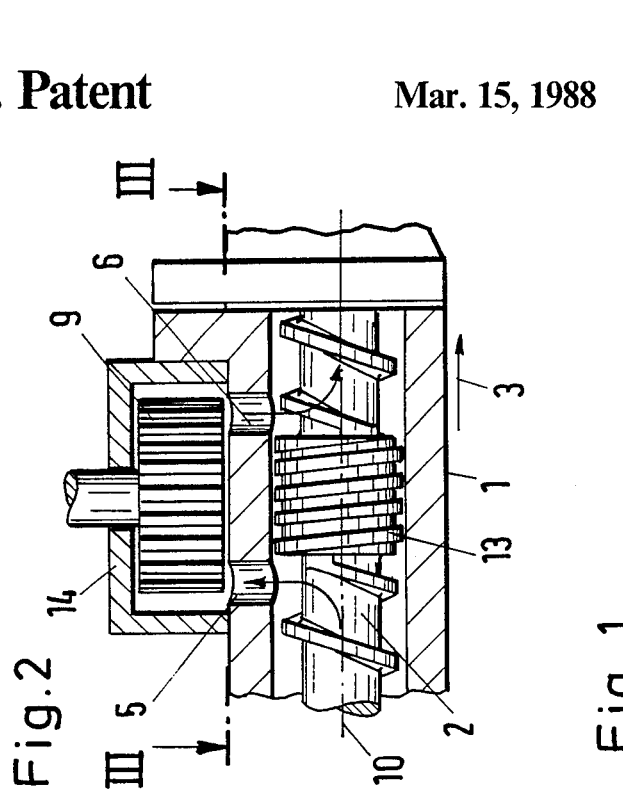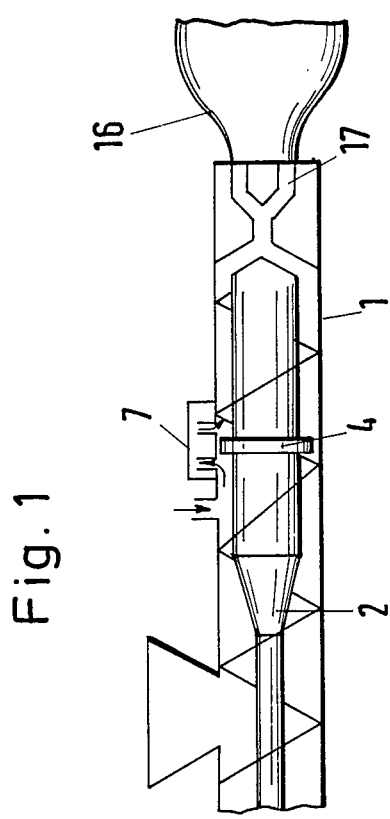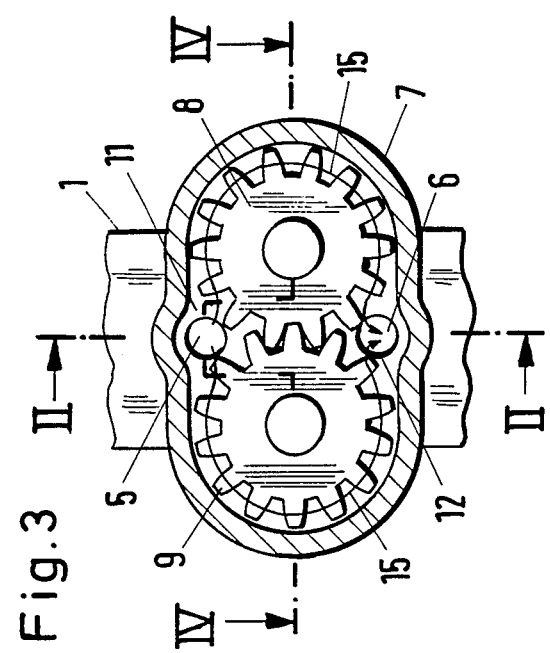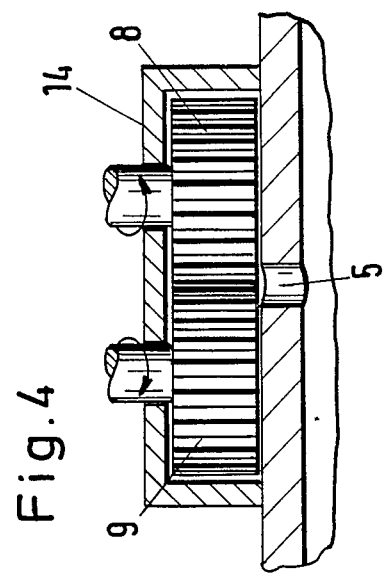

EXTRUSION APPARATUS FOR THE PRODUCTION OF MIXTURES OF MOLTEN SYNTHETIC MATERIAL

FIELD OF THE INVENTION

The present invention relates to an extrusion apparatus primarily, but not exclusively, intended to produce mixtures of molten synthetic material. Typical of such molten synthetic materials are thermoplastics materials which are mixed with a propellant so that the extruded product is a semi-finished expanded or foamed material.

BACKGROUND OF THE INVENTION AND PRIOR ART DISCUSSION

Extrusion apparatuses which comprise a screw rotatable in a hollow cylinder or barrel are known. Such devices include feed apertures for the materials being used. Flow obstruction means are formed on the screw and outlet and inlet apertures disposed, respectively, upstream and downstream of the flow obstruction means are formed in the cylinder or barrel. These two apertures are interconnected through the intermediary of a gear pump. Such an apparatus is disclosed in U.S. Pat. No. 4,431,311, particularly FIG. 2 thereof. In such apparatus, the material leaves the cylinder or barrel through an outlet aperture, which aperture is located upstream of backwash means, constituting the obstruction means, formed on the screw. The aperture conveys the material into a static mixing device through a connection conduit. The material then passes through a gear pump, through a second static mixing device and is then returned into the hollow cylinder or barrel through a suitable located inlet aperture. This ensures through mixing of the constituents of the mixture.

However, there are many disadvantages associated with the provision of such a gear pump. In particular, there are long deflection paths to be covered by the mixture of synthetic material in travelling from the outlet opening from the hollow cylinder through conduit sections to the static mixing means, from the mixing means through conduit sections into the gear pump. These long paths are highly disadvantageous, because deposits are formed in the deflection channels.

On the other hand, it is highly advantageous to provide a gear pump because, by using such a device, a higher, but uniform, build-up of pressure in the material being conveyed can be achieved. This in turn, ensures that the mixture of synthetic material is extruded in a very uniform manner.

OBJECT OF THE INVENTION

It is an object of the invention to provide an improved extrusion apparatus for thermoplastic materials. In particular, the present invention seeks to provide an apparatus which ensures that the processed components are well intermixed, that the length of the screw can be reduced, and that the number of mixing means can also be reduced.

BRIEF SUMMARY OF THE INVENTION

According to the present invention, there is provided an extrusion apparatus for extruding mixtures of molten synthetic material comprising a hollow cylinder, said cylinder including opposed first and second end regions a screw rotatable within said hollow cylinder for conveying said mixture to be extruded from said first end region to said second end region of said hollow cylinder flow obstruction means formed on said screw, gear pump means located on the exterior of said hollow cylinder in the region of said flow obstruction means, said gear pump means comprising a housing and two meshing gear pump wheels rotatable in said housing, said cylinder defining first aperture means disposed upstream of said obstruction means to cause the interior of said cylinder to communicate directly with the interior of said housing upsteam of said gear wheels and second aperture means disposed downstream of said obstruction means to cause said interior of said cylinder to communicate directly with said interior of said housing downstream of said gear wheels, the line joining the centres of said gear wheels extending at right angles to the longitudinal axis of said cylinder and the common tangent to the pitch circles of said gear wheels lying in the same vertical plane as said longitudinal axis of said cylinder, said gear wheels each having major surfaces, said major surfaces extending horizontally.

By disposing the gear pump wheels such that the line joining the centres thereof extends at right angles to the central longitudinal axis of the hollow cylinder and, at the same time, by ensuring that the outlet and inlet apertures for the molten synthetic material are provided in the cylinder lead directly into the pump housing respectively upstream and downstream of the pump gear wheels, the molten synthetic material is subjected merely to two deflections of 90°. These deflections occur, firstly at the inlet to the pump housing and secondly at the outlet from the pump housing when the material is returned to the cylinder.

This measure considerably promotes the homogeneous mixing of the molten synthetic material and the particular additives being employed, such as a propellant. Such an arrangement obviates the need for static mixing means separate from the gear pump, as are necessary in U.S. Pat. No. 4,431,311.

Moreover, a gear pump can be installed in the flow of molten material and requires a minimal number of component parts. This improves the mixing effect and ensures that the molten material has a uniform pressure when it ultimately reaches the extrusion tool or extruder. This is because the present apparatus does not utilise long, pressure-reducing deflection channels or conduits.

By disposing the major surfaces of the pump gear wheels so that they lie horizontally relative to the central longitudinal axis of the hollow cylinder of the extruder and by causing the outlet and inlet openings in the cylinder to communicate direction with regions which are, respectively, upstream and downstream of the gear wheels in the gear pump, the molten material in the pump housing is deflected twice through 90°. After entering the pump housing, the molten material initially meets the upper portion of the inside wall of the housing where it is acted upon by the gear wheels. The mixture is split and is carried, by one or other of the wheels around one part of the internal wall of the housing. The flow around the two wheels then recombine, are remixed and pass back into the cylinder through the inlet opening formed therein. Such re-entry into the hollow cylinder of the extrusion press causes the second deflection through 90°.

This measure causes the molten synthetic material to be thoroughly mixed with its additives, that is to say with, generally, a propellant, in an excellent manner, so that the length of the extrusion and homogenisation screws conventionally used can be substantially reduced and the operation can be effected with a reduced number of mixing means on the screw.

BRIEF DESCRIPTION OF THE DRAWINGS

One embodiment of an extrusion apparatus in accordance with the present invention will be further described, by way of example, with reference to the accompanying drawings, in which:

FIG. 1 is a schematic longitudinal sectional view through an extrusion apparatus.

FIG. 2 is a longitudinal sectional view, similar to FIG. 1, but on an enlarged scale relative thereto, showing details of the extrusion apparatus of FIG. 1.

FIG. 3 is a partial plan view of the apparatus shown in FIG. 1, corresponding generally to a longitudinal sectional view taken along the line III—III of FIG. 1, but rotated through 90°, and FIG. 4 is a partial, longitudinal sectional view taken along the line IV—IV of FIG. 3.

DESCRIPTION OF THE PREFERRED EMBODIMENT

In FIG. 1, there is shown an extrusion apparatus which comprises a screw 2 driven by a drive unit (not shown). The screw 2 rotates in a hollow cylinder 1 and conveys molten material in the direction of arrow 3.

A flow obstruction plate 4 is disposed on the screw 2. The hollow cylinder 1 is provided with an outlet opening 5 through which the molten material may exit the cylinder 1 which opening 5 is disposed upstream of the flow obstruction plate 4. The cylinder 1 also has an inlet opening 6, through which the molten material returns to the cylinder 1. The inlet opening 6 is disposed downstream of the plate 4.

A gear pump 7 is fixedly connected onto the hollow cylinder 1 by means of flanges (not shown) and comprises two meshing gear pump wheels 8 and 9, the centre of which lie on a line extending at right angles to the central longitudinal axis 10 of the hollow cylinder 1, as can be seen in FIG. 3.

The outlet opening 5 and the inlet opening 6 in the hollow cylinder 1 communicate directly with the gear pump 7; the opening 5 leading into an inlet region 11 of the pump and the opening 6 receiving material from an outlet region 12 of the pump.

FIG. 2 shows an arrangement in which a threaded return delivery portion 13 is provided on the conveyor screw 2. This portion 13 is disposed between the outlet opening 5 and the inlet opening 6. Due to the provision of this return delivery thread, molten synthetic material is back-washed and conveyed at a very high pressure, into the outlet opening 5 of the cylinder 1 and hence into the gear pump 7.

Molten material which enters the gear pump 7 passes into the inlet region 11 thereof and is prevented from escaping therefrom by the provision of a cover 14 for the pump 7. The molten material is then received by the gear pump wheels 8 and 9 and is conveyed adjacent the internal surface of the housing of the pump, as is denoted by the arrow 15. In the outlet region 12 of the pump, the molten material is, effectively, centrifuged due to the rapid rotation of the gear wheels 8 and 9 relative to one another and this produces further, and thorough intermixing of the material being extruded.

Subsequently, the molten material returns through the inlet opening 6 into the cylinder 1 and, in so doing, is deflected through 90°. It is conveyed into a screw portion disposed downstream of the threaded return delivery portion 13 so as to be extruded from a tool 17 in the form of a tubular film 16.

I claim:

1. An extrusion apparatus for extruding mixtures of molten synthetic material comprising a hollow cylinder, said cylinder including opposed first and second end regions, a screw rotatable within said hollow cylinder for conveying said mixture to be extruded from said first end region to said second end region of said hollow cylinder, flow obstruction means formed on said screw, gear pump means located on the exterior of said hollow cylinder in the region of said flow obstruction means, said gear pump means comprising a housing and two meshing gear pump wheels rotatable in said housing, said cylinder defining first aperture means disposed upstream of said obstruction means to cause the interior of said cylinder to communicate directly with the interior of said housing upstream of said gear wheels and second aperture means disposed downstream of said obstruction means to cause said interior of said cylinder to communicate directly with said interior of said housing downstream of said gear wheels, the line joining the centre of said gear wheels extending at right angles to the longitudinal axis of said cylinder and the common tangent to the pitch circles of said gear wheels lying in the same vertical plane as said longitudinal axis of said cylinder, said gear wheels each having opposed major surfaces, said major surfaces extending horizontally.

* * * * *